US009246906B1

(12) United States Patent
Zhou et al.

(10) Patent No.: US 9,246,906 B1
(45) Date of Patent: Jan. 26, 2016

(54) METHODS FOR PROVIDING SECURE ACCESS TO NETWORK RESOURCES AND DEVICES THEREOF

(71) Applicant: F5 Networks, Inc., Seattle, WA (US)

(72) Inventors: Dennis Zhou, Fremont, CA (US);
Satoshi Asami, San Jose, CA (US);
Roman Semenov, Tomsk (RU)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 14/192,255

(22) Filed: Feb. 27, 2014

Related U.S. Application Data

(60) Provisional application No. 61/770,013, filed on Feb. 27, 2013.

(51) Int. Cl.
*H04L 29/06* (2006.01)

(52) U.S. Cl.
CPC .................................. *H04L 63/0807* (2013.01)

(58) Field of Classification Search
USPC ....................................................... 726/2–10
See application file for complete search history.

(56) References Cited

U.S. PATENT DOCUMENTS 7,571,180 B2 * 8/2009 Minyailov
2005/0005133 A1 * 1/2005 Xia et al. ...................... 713/185

FOREIGN PATENT DOCUMENTS

WO    2007040858 A1    4/2007

OTHER PUBLICATIONS

F5 Networks, Inc., "SOL11199: Creating a High Availability LDAP Authentication Configuration," pp. 1-3, retrieved from http://support.f5.com/kb/en-us/solutions/public/11000/100/sol11199.print.html on Feb. 27, 2014.

* cited by examiner

*Primary Examiner* — Ghazal Shehni
(74) *Attorney, Agent, or Firm* — LeClairRyan, a Professional Corporation

(57) ABSTRACT

A method, non-transitory computer readable medium, and network traffic management apparatus that receives an authentication request from a user of a client computing device, the request comprising credentials for the user. A connection is established with a selected one of a plurality of active directory servers using a stored Internet Protocol (IP) address for the selected active directory server. At least a portion of a fully qualified domain name of the selected active directory server is received in response to an anonymous lightweight directory access protocol (LDAP) query sent to the selected active directory server using the established connection. The user of the client computing device is authenticated using the at least a portion of the fully qualified domain name and the credentials.

18 Claims, 5 Drawing Sheets

METHODS FOR PROVIDING SECURE ACCESS TO NETWORK RESOURCES AND DEVICES THEREOF

This application claims the benefit of U.S. Provisional Patent Application No. 61/770,013, filed on Feb. 27, 2013, which is hereby incorporated by reference in its entirety.

FIELD

This technology generally relates to methods and devices for providing secure access to network resources and, more particularly, to methods and devices for providing access to network resources secured through active directory servers without requiring a Domain Name Service (DNS) server lookup.

BACKGROUND

Network resource utilization and traffic distribution in a network environment can be optimized using an intermediary network traffic management apparatus configured to communicate with client computing devices and content and/or service providers, such as one or more server computing devices. A network traffic management apparatus can be utilized to receive requests from client computing devices and communicate with the server computing devices to open connections that can be utilized to service the requests. Network traffic management apparatuses can be used in an asymmetric deployment, and disposed proximate either the client computing devices or server computing devices, or in a symmetric deployment, and disposed proximate both the client and server computing devices.

In one asymmetric deployment, a network traffic management apparatus is disposed proximate the server computing devices, such as between the server computing devices connected to a local area network (LAN) and a wide area network (WAN), such as the Internet. In such a deployment, the network traffic management apparatus can perform a variety of functions including enforcing network security policies by facilitating authentication and authorization services. These services can be provided by one or more domain controllers or active directory servers (referred to herein as "active directory servers") in communication with the network traffic management apparatus.

The active directory servers can be managed by a domain name service (DNS) server that monitors the health of the active directory servers and responds to requests from the network traffic management apparatus for the Internet Protocol (IP) address of an active directory server that can provide the appropriate security services. However, reliance by the network traffic management apparatus on the DNS server for such functionality is not desirable because the DNS server is a single point of failure, the round trip communications with the DNS server are expensive, and the DNS server is relatively less efficient at implementing server health monitoring and selection functionality.

SUMMARY

A method for providing secure access to network resources includes receiving, with a network traffic management apparatus, an authentication request from a user of a client computing device, the request comprising credentials for the user. A connection is established, with the network traffic management apparatus, with a selected one of a plurality of active directory servers using a stored Internet Protocol (IP) address for the selected active directory server. At least a portion of a fully qualified domain name of the selected active directory server is received, with the network traffic management apparatus, in response to an anonymous lightweight directory access protocol (LDAP) query sent to the selected active directory server using the established connection. The user of the client computing device is authenticated, with the network traffic management apparatus, using the at least a portion of the fully qualified domain name and the credentials.

A non-transitory computer readable medium having stored thereon instructions for providing secure access to network resources comprising machine executable code which when executed by a processor, causes the processor to perform steps including receiving an authentication request from a user of a client computing device, the request comprising credentials for the user. A connection is established with a selected one of a plurality of active directory servers using a stored Internet Protocol (IP) address for the selected active directory server. At least a portion of a fully qualified domain name of the selected active directory server is received in response to an anonymous lightweight directory access protocol (LDAP) query sent to the selected active directory server using the established connection. The user of the client computing device is authenticated using the at least a portion of the fully qualified domain name and the credentials.

A network traffic management apparatus including at least one of configurable hardware logic configured to be capable of implementing or a processor or a communication interface coupled to a memory and configured to be capable of executing instructions stored in the memory including receiving an authentication request from a user of a client computing device, the request comprising credentials for the user. A connection is established with a selected one of a plurality of active directory servers using a stored Internet Protocol (IP) address for the selected active directory server. At least a portion of a fully qualified domain name of the selected active directory server is received in response to an anonymous lightweight directory access protocol (LDAP) query sent to the selected active directory server using the established connection. The user of the client computing device is authenticated using the at least a portion of the fully qualified domain name and the credentials.

This technology provides a number of advantages including providing more effective methods, non-transitory computer readable medium and devices for providing secure access to network resources. With this technology, a Domain Name Service (DNS) server lookup is not required to identify an IP address or fully qualified domain name of an active directory server to send a user authentication request. Additionally, authentication requests are advantageously load balanced to active directory servers monitored by a network traffic management apparatus. By providing user authentication services without communication with a DNS server and by load balancing user authentication requests, client computing device users can access secured network resources more quickly, thereby improving the user experience.

DETAILED DESCRIPTION

Figure 1:
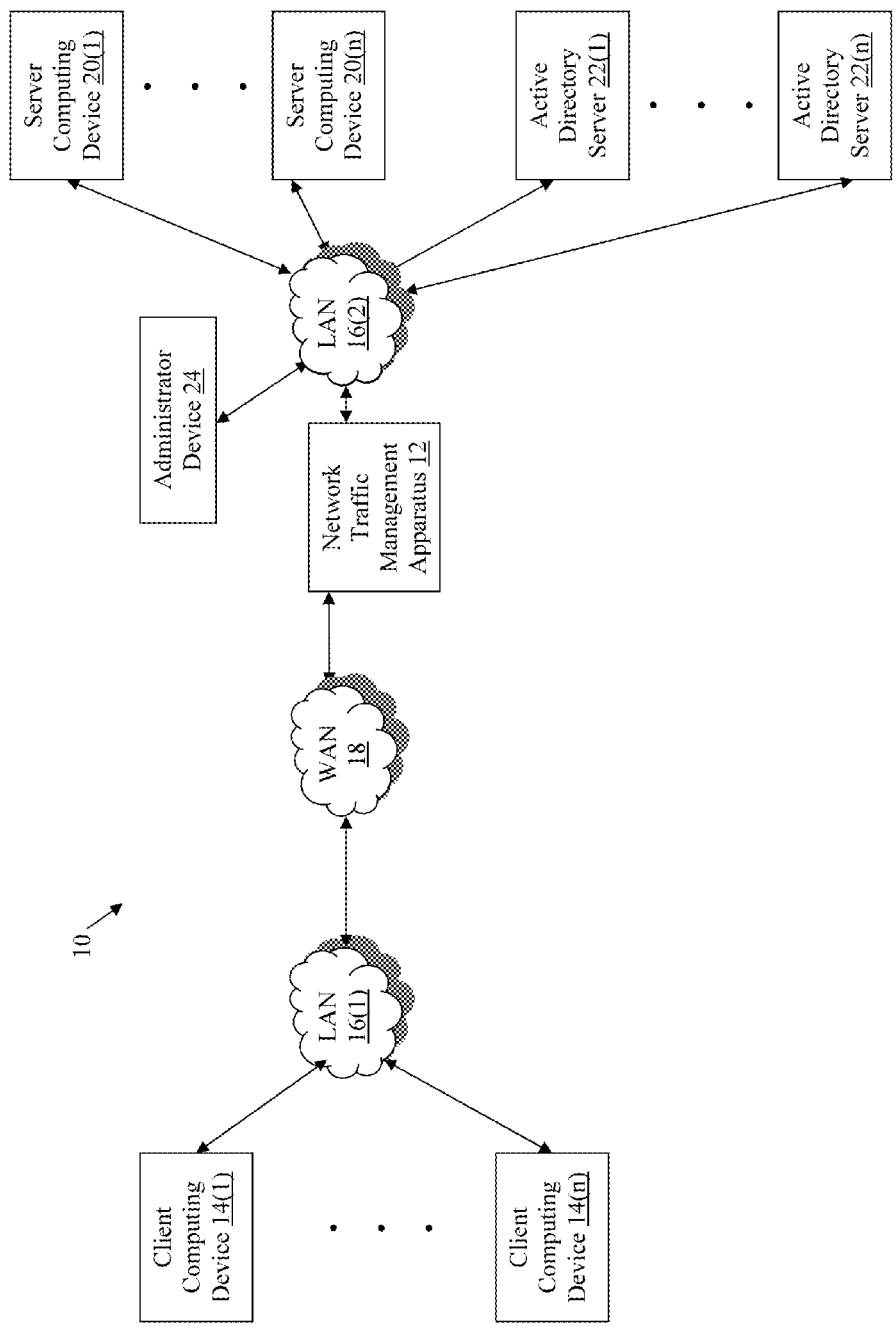
FIG. 1 a block diagram of a network environment with an exemplary network traffic management apparatus.

Referring to FIG. 1, a block diagram is shown including an exemplary network environment 10 which incorporates an exemplary network traffic management apparatus 12 in an asymmetric deployment. The network traffic management apparatus 12 is coupled to a plurality of client computing devices 14(1)-14(n) through a local area network (LAN) 16(1) and a wide area network (WAN) 18 and a plurality of server computing devices 20(1)-20(n), a plurality of active directory servers 22(1)-22(n), and a administrator device 24 through another LAN 16(2), although the network traffic management apparatus 12, client computing devices 14(1)-14(n), server computing devices 20(1)-20(n), active directory servers 22(1)-22(n), and/or administrator device 24 may be coupled together via other topologies. Additionally, the network environment 10 may include other network devices such as one or more routers and/or switches, for example. This technology provides a number of advantages including method, non-transitory computer readable medium, and network traffic management apparatus 12 that relatively efficiently implements network security policies to provide authentication and authorization services without communicating with a Domain Name Service (DNS) server.

Figure 2:
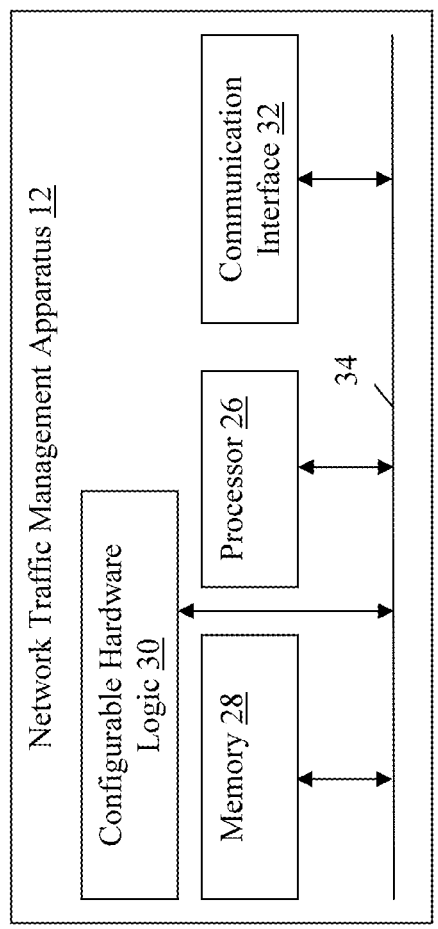
FIG. 2 is a block diagram of the exemplary network traffic management apparatus.

Referring to FIGS. 1-2, the network traffic management apparatus 12 may perform any number of functions, such as optimizing, securing, and load balancing the network traffic between the client computing devices 14(1)-14(n) and the server computing devices 20(1)-20(n). The network traffic management apparatus 12 includes at least one processor 26, a memory 28, optional configurable hardware logic 30, and a communication interface 32 which are coupled together by a bus 34, although the network traffic management apparatus 12 may include other types and numbers of elements in other configurations. In this example, the bus 34 is a hyper-transport bus, although other bus types and communication links may be used, such as PCI.

The processor 26 of the network traffic management apparatus 12 may execute programmed instructions stored in the memory of the network traffic management apparatus 12 for the any number of the functions identified above for managing network traffic and/or optimizing service of resource requests. The processor 26 of the network traffic management apparatus 12 may comprise one or more CPUs or general purpose processors with one or more processing cores.

The memory 28 of the network traffic management apparatus 12 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 26, can be used for the memory 28.

The optional configurable hardware logic 30 of the network traffic management apparatus 12 may comprise specialized hardware configured to be capable of implementing one or more steps of this technology, as illustrated and described with reference to the examples herein. By way of example only, the optional configurable logic 30 may comprise one or more of field programmable gate arrays (FPGAs), field programmable logic devices (FPLDs), application specific integrated circuits (ASICs) and/or programmable logic units (PLUs).

The communication interface 32 operatively couples and communicates between the network traffic management apparatus 12, the client computing devices 14(1)-14(n), server computing devices 20(1)-20(n), and active directory servers 22(1)-22(n), which are all coupled together by the LANs 16(1)-16(2) and WAN 18, although other types and numbers of communication networks or systems with other types and numbers of connections and configurations to other devices and elements. By way of example only, the LANs 16(1)-16(2) and WAN 18 can use TCP/IP over Ethernet and industry-standard protocols, including NFS, CIFS, SOAP, XML, LDAP, and SNMP, although other types and numbers of communication networks, can be used.

The LANs 16(1)-16(2) in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN may comprise any wide area network (e.g., Internet), although any other type of traffic network topology may be used.

Each of the client computing devices 14(1)-14(n) and server computing devices 20(1)-20(n) includes a processor, a memory, an interface device, and a communication system, which are coupled together by a bus or other link, although other numbers and types of network devices could be used. The client computing devices 14(1)-14(n) may run interface applications, such as Web browsers, that may provide an interface to make requests for and receive content stored on one or more of the server computing devices via the LANs 16(1)-16(2) and/or WAN 18.

Generally, the server computing devices 20(1)-20(n) process requests received from requesting client computing devices 14(1)-14(n) via the LAN(s) 16(1)-16(n) and/or the WAN 18 according to the HTTP-based application RFC protocol or the CIFS or NFS protocol, for example. Various network processing applications, such as CIFS applications, NFS applications, HTTP Web Server computing device applications, and/or FTP applications, may be operating on the server computing devices 20(1)-20(n) and transmitting data (e.g., files or Web pages) to the network traffic management apparatus 12 in response to requests from the client computing devices 14(1)-14(n).

The server computing devices 20(1)-20(n) may provide data or receive data in response to requests directed toward the respective applications on the server computing devices 20(1)-20(n) from the client computing devices 14(1)-14(n). The server computing devices 20(1)-20(n) may be hardware or software or may represent a system with multiple server computing devices in a server computing device pool, which may include internal or external networks. Further, additional server computing devices may be coupled to one of the LANs 16(1)-16(n) and many different types of applications may be available on each of the server computing devices 20(1)-20(n).

In this example, each of the active directory servers 22(1)-22(n) provides authentication and authorization services, based on a network security policy, allowing users of the client computing devices 14(1)-14(n) to access resources provided by the server computing devices 20(1)-20(n). The active directory servers 22(1)-22(n) each include a processor, a memory, and a communication interface, which are coupled together by a bus or other link, although other numbers and types of network devices could also be included in each of the active directory servers 22(1)-22(n).

The administrator device 24 includes a processor, a memory, a communication interface, an input device, and a display device, which are coupled together by a bus or other link. A user of the administrator device 24 may communicate with the network traffic management apparatus 12 over the LAN 16(2) to configure the network traffic management apparatus 12, such as by establishing security and access policies and/or providing Internet Protocol (IP) addresses of the active directory servers 22(1)-22(n), for example, as described and illustrated in more detail later.

Although the exemplary network environment 10 with the client computing devices 14(1)-14(n), network traffic management apparatus 12, server computing devices 20(1)-20(n), active directory servers 22(1)-22(n), administrator device 24, LANs 16(1)-16(n), and WAN 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, which when executed by a processor, cause the processor to carry out the steps necessary to implement the methods of the examples, as described and illustrated herein.

Figure 3:
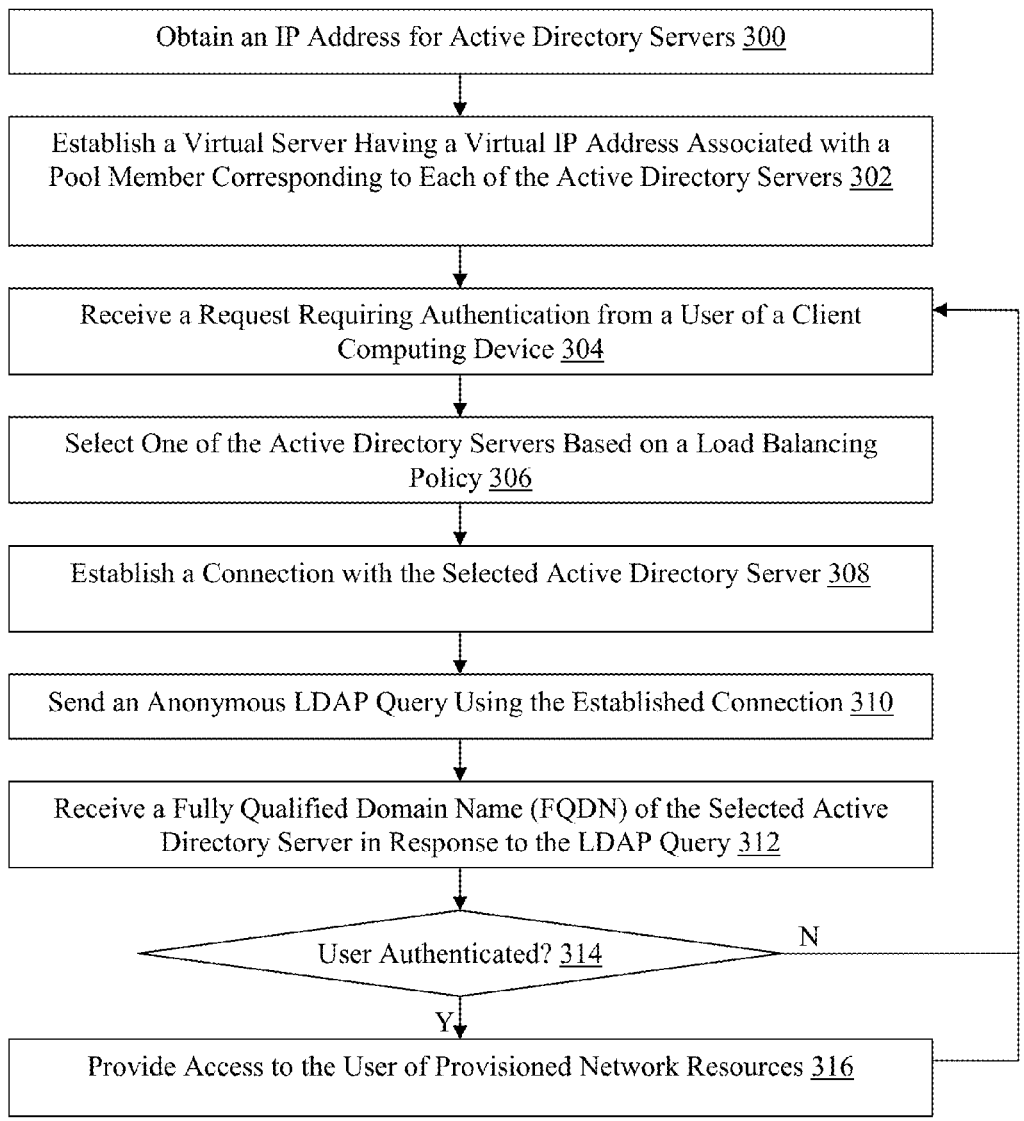
FIG. 3 is a flowchart of an exemplary method for providing secure access to network resources.

An exemplary method for providing secure access to network resources will now be described with reference to FIGS. 1-5. Referring more specifically to FIG. 3, in step 300 in this example, the network traffic management apparatus 12 obtains an Internet Protocol (IP) address for each of the plurality of active directory servers 22(1)-22(n). The IP addresses can be provided by an administrator of the network traffic management apparatus 12 using the administrator device 24, for example, and can be stored in the memory 28 of the network traffic management apparatus 12, although the IP addresses can also be obtained from other locations and in other manners and can be stored elsewhere.

In step 302, the network traffic management apparatus 12 establishes a virtual server having a virtual IP address. The virtual IP address of the virtual server is associated with a virtual pool having a plurality of members, each of which corresponds to one of the active directory servers 22(1)-22(n). The virtual server is configured to open connections and facilitate TCP/IP communications with each of the active directory servers 22(1)-22(n) through the pool members.

Figure 4:
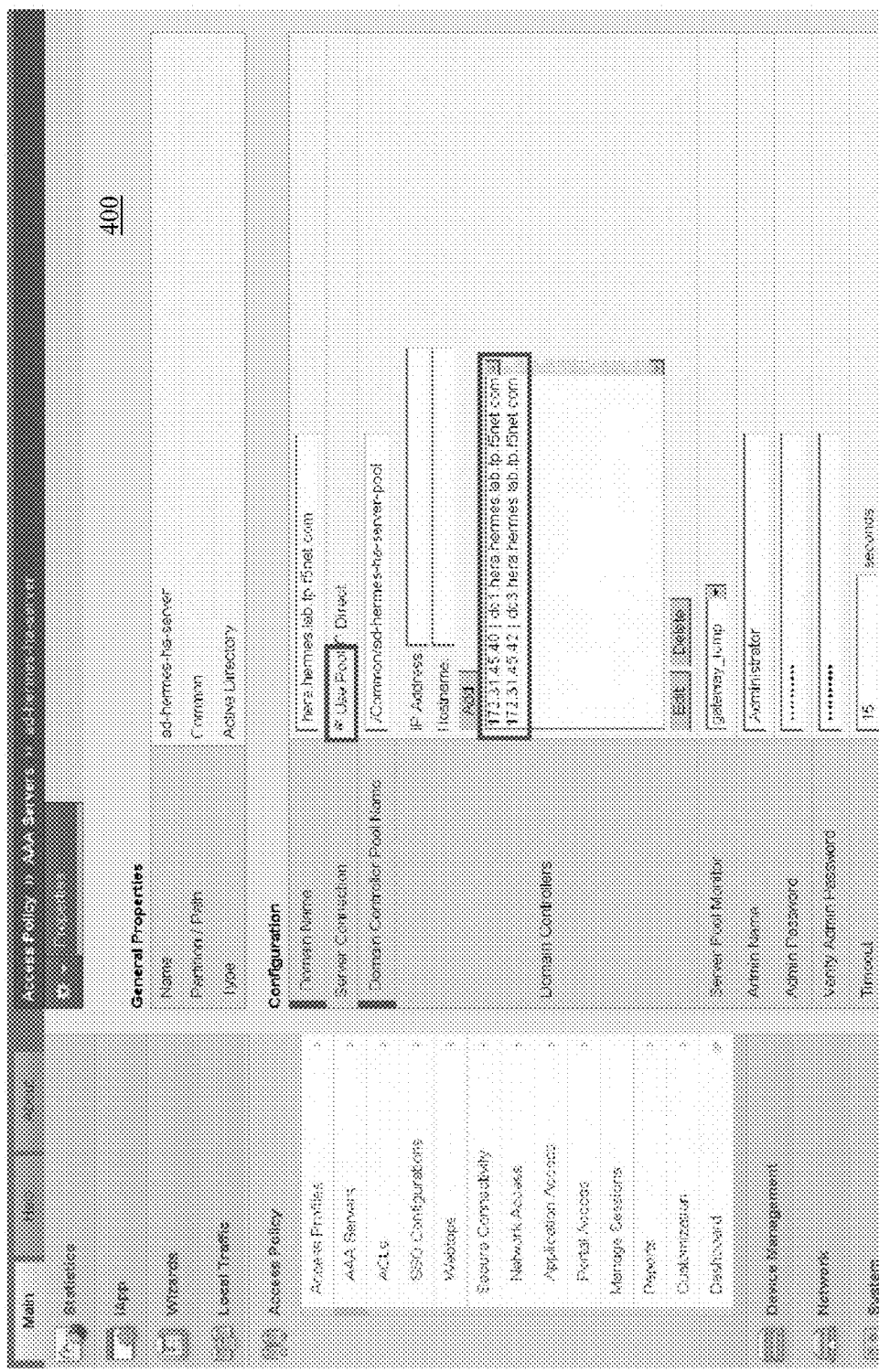
FIG. 4 is a screenshot of an exemplary administrator interface used to configure the exemplary network traffic management apparatus.

Referring more specifically to FIG. 4, a screenshot of an exemplary administrator interface 400 used to configure the network traffic management apparatus 12 is illustrated. The administrator interface 400 can be provided by the network traffic management apparatus 12 to the administrator device 24 via the WAN 18, for example. In this example, an administrator using the administrator device 24 can input the IP address of each of the active directory servers 22(1)-22(n) corresponding to pool members (referred to in the administrator interface 400 as domain controllers) associated with the virtual server (referring to as "her hermes lab fp.f5net.com" in the administrator interface 400).

Referring back to FIG. 3, in step 304, the network traffic management apparatus 12 receives a request requiring authentication from a user of one of the client computing devices 14(1)-14(n). The request can include credentials for the user including a name and a realm (e.g., user@realm) which require authentication by one of the active directory servers 22(1)-22(n) prior to network resources hosted by the server computing devices 20(1)-20(n) being provisioned for and accessed by the user.

In step 306, the network traffic management apparatus 12 selects an active one of the active directory servers 22(1)-22(n) to service the request and provide the authentication services. The selection by the network traffic management apparatus 12 can be based on a load balancing policy established by an administrator of the network traffic management apparatus 12 using the administrator device 24 and stored in the memory 28, for example. Optionally, the network traffic management apparatus 12 can continuously or periodically monitor the active directory servers 22(1)-22(n) for various health-related characteristics such as performance, load, throughput, and round trip times of communications, for example, although any other health-related characteristics can also be monitored. The values for the monitored characteristics can be used by the network traffic management apparatus 12 to apply the load balancing policy, for example, although the load balancing can be performed by the network traffic management apparatus 12 based on other information or factors.

In step 308, the network traffic management apparatus 12 establishes a connection with an active the one of the active directory servers 22(1)-22(n) selected in step 306. The connection can be a TCP/IP connection established between the virtual server established in the second step and the one of the active directory servers 22(1)-22(n). The connection can be established using the IP address of the one of the active directory servers 22(1)-22(n) obtained in step 300. Because the IP addresses of the active directory servers 22(1)-22(n) are obtained and stored in the memory 28 in this example, the network traffic management apparatus 12 can advantageously monitor the health of the active directory servers 22(1)-22(n), as well as select and establish a connection with one of the active directory servers 22(1)-22(n), without utilizing a DNS server.

In step 310, the network traffic management apparatus 12 sends an anonymous lightweight directory access protocol (LDAP) query to the selected one of the active directory servers 22(1)-22(n) using the connection established in step 308. The anonymous LDAP query in this example does not include any user credentials but is utilized to obtain public information provided by the one of the active directory servers 22(1)-22(n), including at least a portion of the fully qualified domain name (FQDN) of the one of the active directory servers 22(1)-22(n).

In some examples, the network traffic management apparatus 12 may be configured to communicate with various network devices using IP addresses. However, an authentication protocol utilized to authenticate user credentials, such as Kerberos for example, may utilize a FQDN, or portion thereof. In an example in which Kerberos is used, the network traffic management apparatus 12 must use the FQDN of the selected, active one of the active directory servers 22(1)-22(n) in the ticket granting service request (TGS-REQ). Since the network traffic management apparatus 12 is not aware of which of the active directory servers 22(1)-22(n) it will be connected to via the virtual server until the connection is made, the LDAP query sent in step 310 allows the network traffic management apparatus 12 to discover the FQDN of the selected one of the active directory servers 22(1)-22(n) after the connection is established. Accordingly, in step 312, in response to the LDAP query sent in step 310, the network traffic management apparatus 12 receives at least a portion of the FQDN of the selected one of the active directory servers 22(1)-22(n).

With the at least a portion of the FQDN, in step 314, the network traffic management apparatus 12 attempts to authenticate the user credentials submitted in the step 304 by communicating with the selected one of the active directory servers 22(1)-22(n) according to an authentication protocol, such as Kerberos for example. If the network traffic management apparatus 12 determines in step 314 that the user of the one of the client computing devices 14(1)-14(n) is successfully authenticated, then the Yes branch is taken to step 316.

In step 316, the network traffic management apparatus 12 provides access to the user of the one of the client computing devise 14(1)-14(n) to network resources provisioned by the selected one of the active directory servers 22(1)-22(n). The network resources can be content or services hosted by one or more of the server computing devices 20(1)-20(n) and can be provisioned based on a security policy maintained by the selected one of the active directory servers 22(1)-22(n). Accordingly, in addition to authenticating users, the active directory servers 22(1)-22(n) can be configured to determine the network resources the users are authorized to access, based on a stored policy, and provision those resources accordingly.

Referring back to step 314, if the network traffic management apparatus 12 determines that the user of the one of the client computing devices 14(1)-14(n) is not successfully authenticated, then the No branch is taken to step 304 and an additional request requiring authentication is received, as described and illustrated earlier. It should be appreciated that any of steps 304-316 can occur in parallel for various users of the client computing devices 14(1)-14(n).

Figure 5:
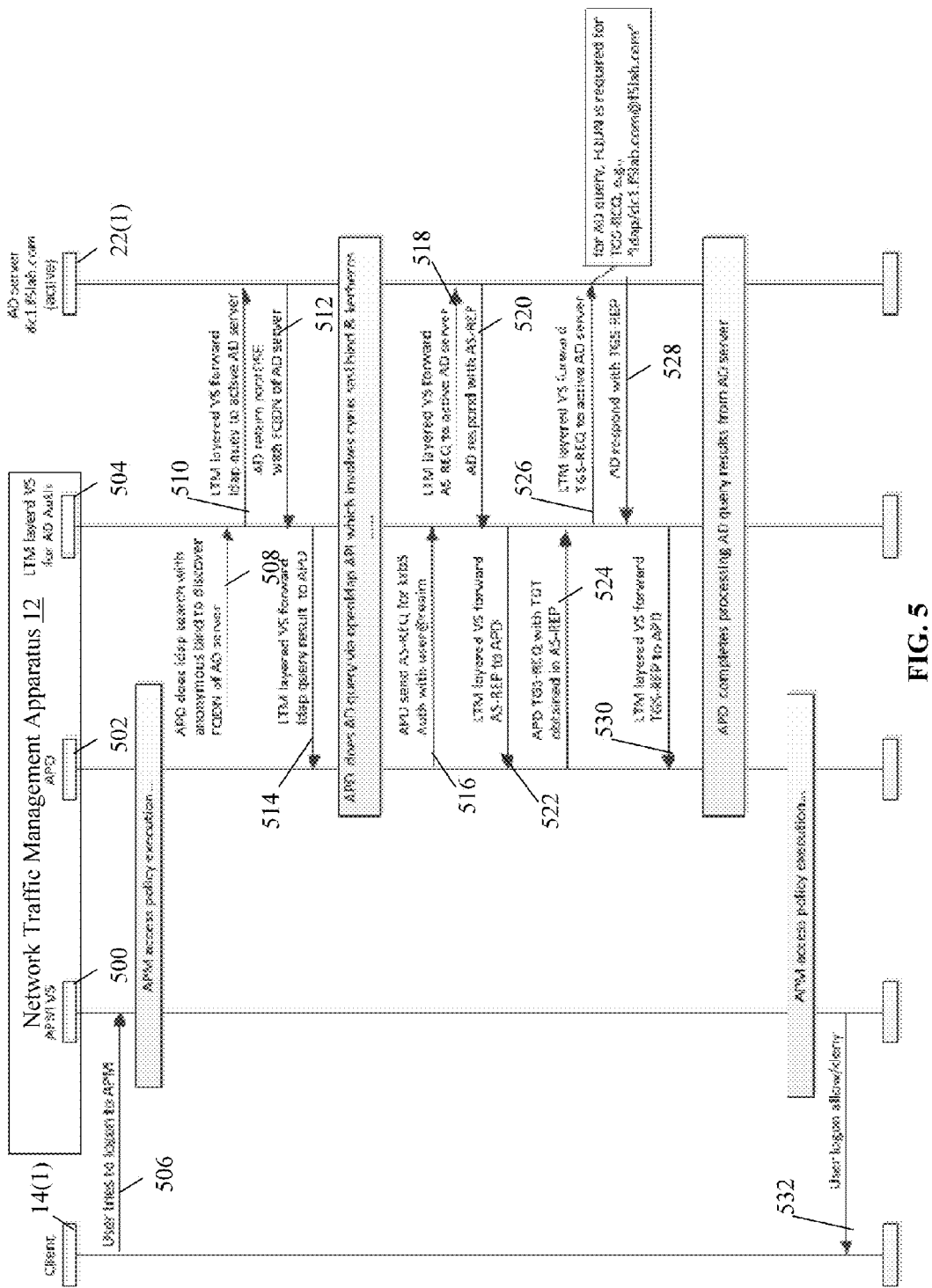
FIG. 5 is a timing diagram illustrating an exemplary method for providing secure access to network resources.

Referring more specifically to FIG. 5, a timing diagram of an exemplary method for providing secure access to network resources is illustrated. In this example, the network traffic management apparatus 12 includes an access policy manager (APM) 500, an access policy daemon 502, and the virtual server 504 described and illustrated earlier with reference to step 302 of FIG. 3, for example. The access policy manager (APM) 500, access policy daemon 502, and virtual server 504 can be modules comprising programmed instructions stored in the memory 28 of the network traffic management apparatus 12 and executable by the processor 26 of the network traffic management apparatus 12, for example. Other modules can also be provided and can perform one or more of the steps described and illustrated with reference to FIG. 5.

In step 506 in this example, a user of the client device 14(1) sends an authentication request to the network traffic management apparatus 12. In this example, the request is received by the access policy manager 500 of the network traffic management apparatus 12, although the request can also be received by other modules. The access policy manager 500 determines based on the received request that an access policy is to be executed by the network traffic management apparatus 12 and communicates the determination to the access policy daemon 502. Additionally, the authentication request in this example includes credentials for the user of the client device 14(1).

In step 508 in this example, the access policy daemon of the network traffic management apparatus 12 initiates an anonymous LDAP query to the virtual server 504 in this example. In step 510, the virtual server selects one of the active directory servers 22(1)-22(n) (active directory server 22(1) in the example illustrated in FIG. 5). The active directory server 22(1) can be selected based on a load balancing decision made based on health monitoring of the active directory servers 22(1)-22(n), for example, although the selection can be made based on other criteria. Upon selection of the active directory server 22(1), the virtual server 504 forwards the anonymous LDAP query to the active directory server 22(1) using an IP address of the active directory server 22(1) previously stored, such as by an administrator of the network traffic management apparatus, for example.

In step 512 in this example, the active directory server 22(1) returns its FQDN, or a portion thereof, to the virtual server 504 of the network traffic management apparatus 12 in response to the anonymous LDAP query received in step 510. In step 514, the virtual server 504 of the network traffic management apparatus 12 forwards the anonymous LDAP query result to the access policy daemon 502. Accordingly, the network traffic management apparatus 12 in this example learns the FQDN of the active directory server 22(1) without ever communicating with a DNS server. The FQDN is used as described and illustrated later to execute an authentication protocol, such as Kerberos in this example.

In step 516, the access policy daemon 502 of the network traffic management apparatus 12 sends an AS-REQ message to the virtual server 504 to initiate Kerberos authentication, although other types of authentication protocols can also be used. The AS-REQ message in this example includes the user credentials received in step 506. In step 518, the virtual server 504 of the network traffic management apparatus 12 forwards the AS-REQ to the active directory server 22(1).

In step 520, the active directory server 22(1) responds to the received AS-REQ message with an AS-REP message, which in this example includes a ticket granting ticket (TGT). In step 522, the virtual server 504 forwards the received AS-REP to the access policy daemon 502. In response in step 524, the access policy daemon 502 of the network traffic management device 12 sends a TGS-REQ with the TGT obtained in step 522 and the FQDN obtained in step 514 to the virtual server 504. In step 526, the virtual server 504 of the network traffic management apparatus 12 forwards the ticket granting server request (TGS-REQ) to the active directory server 22(1). In response in step 528, the active directory server 22(1) sends an TGS-REP message to the virtual server 504. The virtual server 504 of the network traffic management apparatus 12 forwards the TGS-REP to the access policy daemon 502 in step 530.

Upon receipt of the TGS-REP message, the execution of the access policy execution terminates and the access policy daemon 502 communicates with the access policy manager 500 to allow or deny the user of the client device 14(1) access to resources stored by one or more of the server computing devices 20(1)-20(n) depending on the contents of the TGS-REP and/or the outcome of the execution of the authentication protocol. While steps 516-530 generally correspond with the Kerberos authentication protocol, other authentication protocols can also be used in other examples.

By this technology, a network traffic management apparatus can provide secure access to network resources relatively efficiently without utilizing third party libraries requiring a DNS server look-up. With this technology, an enterprise network administrator can input IP addresses of active directory servers to a network traffic management apparatus which can monitor the health of the active directory servers and load balance user authentication requests to the active directory servers via connections with an internal virtual server. The internal virtual server can learn the fully qualified domain name of an active, selected one of the active directory servers using an anonymous LDAP query. Accordingly, aspects of the authentication functionality can be implemented with a relatively efficient network traffic management apparatus, thereby improving user response time, throughput, and utilization of the active directory server pool.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for providing secure access to network resources, the method comprising:
   receiving, by a network traffic management apparatus, an authentication request from a user of a client computing device, the authentication request comprising credentials for the user;
   establishing, by the network traffic management apparatus, a connection with a selected one of a plurality of active directory servers using a stored Internet Protocol (IP) address for the selected one of the plurality of active directory servers;
   sending, by the network traffic management apparatus, an anonymous lightweight directory access protocol (LDAP) query to the selected one of the plurality of active directory servers using the established connection;
   receiving, by the network traffic management apparatus, at least a portion of a fully qualified domain name of the selected one of the plurality of active directory servers in response to the anonymous LDAP query; and
   authenticating, by the network traffic management apparatus, the user of the client computing device using the at least a portion of the fully qualified domain name and the credentials.

2. The method as set forth in claim 1, further comprising providing, by the network traffic management apparatus, one or more network resources provisioned by the selected one of the plurality of active directory servers to the user of the client computing device in response to one or more requests received from the client computing device for the network resources.

3. The method as set forth in claim 1, further comprising establishing, by the network traffic management apparatus, a virtual server having a virtual IP address and associated with a pool member corresponding to each of the plurality of active directory servers.

4. The method as set forth in claim 3, wherein the connection is a TCP/IP connection established between the virtual server and the selected one of the plurality of active directory servers.

5. The method as set forth in claim 1, further comprising monitoring, by the network traffic management apparatus, health of the plurality of active directory servers, wherein the selected one of the plurality of active directory servers is selected based on the monitoring.

6. The method as set forth in claim 1, wherein the authentication is performed at least in part based on a Kerberos protocol.

7. A non-transitory computer readable medium having stored thereon instructions for providing secure access to network resources comprising machine executable code which when executed by a processor, causes the processor to perform steps comprising:
   receiving an authentication request from a user of a client computing device, the authentication request comprising credentials for the user;
   establishing a connection with a selected one of a plurality of active directory servers using a stored Internet Protocol (IP) address for the selected one of the plurality of active directory servers;
   sending an anonymous lightweight directory access protocol (LDAP) query to the selected one of the plurality of active directory servers using the established connection;
   receiving at least a portion of a fully qualified domain name of the selected one of the plurality of active directory servers in response to the anonymous LDAP query; and
   authenticating the user of the client computing device using the at least a portion of the fully qualified domain name and the credentials.

8. The medium as set forth in claim 7, further having stored thereon instructions comprising machine executable code which when executed by the processor cause the processor to perform steps further comprising providing one or more network resources provisioned by the selected one of the plurality of active directory servers to the user of the client computing device in response to one or more requests received from the client computing device for the network resources.

9. The medium as set forth in claim 7, further having stored thereon instructions comprising machine executable code which when executed by the processor cause the processor to perform steps further comprising establishing a virtual server having a virtual IP address and associated with a pool member corresponding to each of the plurality of active directory servers.

10. The medium as set forth in claim 9, wherein the connection is a TCP/IP connection established between the virtual server and the selected one of the plurality of active directory servers.

11. The medium as set forth in claim 7, further having stored thereon instructions comprising machine executable code which when executed by the processor cause the processor to perform steps further comprising monitoring health of the plurality of active directory servers, wherein the selected one of the plurality of active directory servers is selected based on the monitoring.

12. The medium as set forth in claim 7, wherein the authentication is performed at least in part based on a Kerberos protocol.

13. A network traffic management apparatus comprising:
a processor coupled to a memory and configured to be capable of executing instructions comprising and stored in the memory to:
receive an authentication request from a user of a client computing device, the authentication request comprising credentials for the user;
establish a connection with a selected one of a plurality of active directory servers using a stored Internet Protocol (IP) address for the selected one of the plurality of active directory servers;
send an anonymous lightweight directory access protocol (LDAP) query to the selected one of the plurality of active directory servers using the established connection;
receive at least a portion of a fully qualified domain name of the selected one of the plurality of active directory servers in response to the anonymous LDAP query; and
authenticate the user of the client computing device using the at least a portion of the fully qualified domain name and the credentials.

14. The apparatus as set forth in claim 13, wherein the processor is further configured to be capable of executing one or more additional instructions comprising and stored in the memory to provide one or more network resources provisioned by the selected one of the plurality of active directory servers to the user of the client computing device in response to one or more requests received from the client computing device for the network resources.

15. The apparatus as set forth in claim 13, wherein the processor is further configured to be capable of executing one or more additional instructions comprising and stored in the memory establish a virtual server having a virtual IP address and associated with a pool member corresponding to each of the plurality of active directory servers.

16. The apparatus as set forth in claim 15, wherein the connection is a TCP/IP connection established between the virtual server and the selected one of the plurality of active directory servers.

17. The apparatus as set forth in claim 13, wherein the processor is further configured to be capable of executing one or more additional instructions comprising and stored in the memory monitor health of the plurality of active directory servers, wherein the selected one of the plurality of active directory servers is selected based on the monitoring.

18. The apparatus as set forth in claim 13, wherein the authentication is performed at least in part based on a Kerberos protocol.

* * * * *